United States Patent
Chowdhary et al.

(10) Patent No.: US 8,280,754 B2
(45) Date of Patent: *Oct. 2, 2012

(54) SYSTEM AND METHOD FOR MODELING SLOW CHANGING DIMENSION AND AUTO MANAGEMENT USING MODEL DRIVEN BUSINESS PERFORMANCE MANAGEMENT

(75) Inventors: Pawan Raghunath Chowdhary, Montrose, NY (US); Hung-Yang Chang, Scarsdale, NY (US); David W. Harrison, Patterson, NY (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

This patent is subject to a terminal disclaimer.

(21) Appl. No.: 11/768,687

(22) Filed: Jun. 26, 2007

(65) Prior Publication Data

US 2009/0006146 A1    Jan. 1, 2009

(51) Int. Cl.
*G06Q 10/00*    (2012.01)
(52) U.S. Cl. .................. 705/7.11; 705/7.12; 705/7.22
(58) Field of Classification Search .............. 705/7.11, 705/7.12, 7.22
See application file for complete search history.

(56) References Cited

U.S. PATENT DOCUMENTS

| | | | |
|---|---|---|---|
| 6,847,973 B2 * | 1/2005 | Griffin et al. | 1/1 |
| 7,418,453 B2 * | 8/2008 | Chowdhary et al. | 1/1 |
| 7,475,080 B2 * | 1/2009 | Chowdhary et al. | 1/1 |
| 7,720,804 B2 * | 5/2010 | Fazal et al. | 707/601 |
| 7,814,470 B2 * | 10/2010 | Mamou et al. | 717/162 |
| 2002/0099563 A1 * | 7/2002 | Adendorff et al. | 705/1 |
| 2002/0133368 A1 * | 9/2002 | Strutt et al. | 705/1 |
| 2006/0112109 A1 | 5/2006 | Chowdhary et al. | |

OTHER PUBLICATIONS

William KcKnight, "DW Design in the Real World, Part 5: Slowly Changing Dimensions" DM Review. New York: Jun 2007. vol. 17, Iss. 6; p. 40.*

* cited by examiner

*Primary Examiner* — Mark Fleischer
(74) *Attorney, Agent, or Firm* — F. Chau & Associates, LLC; Daniel P. Morris, Esq.

(57) ABSTRACT

A system for generating a model for tracking a changing dimension feature of data in a business model includes a memory for storing the business model and a computer readable code for modeling the changes in the changing dimension feature and a processor for executing the computer readable code to perform method steps including capturing the changing dimension feature of the business model, transforming the changing dimension feature into a data warehouse model corresponding the business model, identifying changing dimensions and attributes in the changing dimension feature according to the data warehouse model, and generating a run-time deployable component for tracking the changing dimension feature based on the identified changing dimensions and attributes.

11 Claims, 10 Drawing Sheets

```
CREATE TABLE pwhse.dimTable (
    dimTablePKey Integer,
    dimTableCol1 Varchar(254),
    dimTableCol1 Varchar(254)
)
```

Original Dimension Schema

```
CREATE TABLE pwhse.dimTable (
    dimTable_SKey BIGINT NOT NULL PRIMARY KEY
        GENERATED ALWAYS AS IDENTITY,
    isActive SMALLINT DEFAULT 1,
    SurrogateCreateTime TIMESTAMP DEFAULT CURRENT TIMESTAMP,
    SurrogateEndTime TIMESTAMP,
    dimTablePKey Integer,
    dimTableCol1 Varchar(254),
    dimTableCol1 Varchar(254)
)
```

Updated Dimension Schema with Slow changing dimension

501 — 
```
MERGE into dimTable t1
 USING
 (SELECT DISTINCT
       dimTablePKeyVal,
       dimTableCol1Val
 )AS A1
 ON
 T1. dimTablePKeyVal=A1.dimTablePKeyVal WHEN NOT MATCHED THEN
 INSERT (dimTablePKey, dimTableCol1)

VALUES (dimTablePKeyVal, dimTableCol1Val)
```
Original SQL Script

FIG. 5B

502 — 
```
MERGE into dimTable t1
 USING
 (SELECT DISTINCT
       dimTablePKeyVal,
       dimTableCol1Val
 )AS A1
 ON
 T1.dimTablePKeyVal=A1.dimTablePKeyVal
 AND T1.dimTableCol1Val=A1.
       dimTableCol1Val WHEN NOT MATCHED THEN
 INSERT (dimTablePKey, dimTableCol1)

VALUES (dimTablePKeyVal, dimTableCol1Val)
```
Modified SQL Script to support slow changing dimension

FIG. 6

```xml
<bpmschema xmlns= "http://com/bpm/pwhse/metadata.ecore"
xmlns:xsi="http://www.w3.org/2001/XMLSchema-instance"
xsi:schemaLocation="http://com/bpm/pwhse/metadata.ecore PWMetaIData.xsd" >
    <DimensionDefinition>
        <dimensionID>24</dimensionID>
        <dimensionName>EmpDim</dimensionName>
        <dimensionTable>EmpDim</dimensionTable>
        <isExisting>false</isExisting>
        <isPopulatedRunTime>true</isPopulatedRunTime>
        <isTimeIndexForArray>0</isTimeIndexForArray>
        <isSlowChangingDimension>1</isSlowChangingDimension>
        <CreateTimestamp>Tue Jan 16 12:21:24 EST 2007</CreateTimestamp>
        <DimensionAttributeDefinition>
            <columnDataSize></columnDataSize>
            <columnDataType>BIGINT</columnDataType>
            <columnisPKey>true</columnisPKey>
            <columnLevel>0</columnLevel>
            <columnName>EmpCNum</columnName>
            <is PartOfSCD>0</isPartOfSCD>
            <CreateTimestamp> Tue Jan 16 12:21:24 EST 2007</CreateTimestamp>
            <ModifiedTimestamp> Tue Jan 16 12:21:24 EST 2007</ModifiedTimestamp>
        </DimensionAttributeDefinition>
        <DimensionAttributeDefinition>
            <columnDataSize>254</columnDataSize>
            <columnDataType>VARCHAR</columnDataType>
            <columnisPKey>false</columnisPKey>
            <columnLevel>1</columnLevel>
            <columnName>CountryCode</columnName>
            <isPartOfSCD>1</isPartOfSCD>
            <CreateTimestamp> Tue Jan 16 12:21:24 EST 2007</CreateTimestamp>
            <ModifiedTimestamp> Tue Jan 16 12:21:24 EST
2007</ModifiedTimestamp>
        </DimensionAttributeDefinition>
        . . ......more
```

```
MERGE into pwhse.EmpDim T1
USING
(SELECT DISTINCT
v0.StringValue AS EmailAddr,
v1.StringValue AS MgrCNum,
v2.StringValue AS MgrName,
v3.StringValue AS CountryCode,
v4.StringValue AS CNum,
v5.StringValue AS Name,
v6.StringValue AS StatusCode,
v7.StringValue AS SerialNum FROM pwhse.CPVALUES v0,
pwhse.CPVALUES v1,
pwhse.CPVALUES v2,
pwhse.CPVALUES v3,
pwhse.CPVALUES v4,
pwhse.CPVALUES v5,
pwhse.CPVALUES v6,
pwhse.CPVALUES v7

WHERE v0.itemname='EmpEmailAddr' AND
v1.itemname='MgrCNum'AND
v2.itemname='MgrName'AND
v3.itemname='EmpCountryCode'AND
v4.itemname='CNum'AND
v5.itemname='EmpName'AND
v6.itemname='EmpStatusCD'AND
v7.itemname='EmpSerialNum'
AND v0.contextinstanceid= v1.contextinstanceid AND
v1.contextinstanceid=v2.contextinstanceid AND
v2.contextinstanceid=v3.contextinstanceid AND
v3.contextinstanceid=v4.contextinstanceid AND
v4.contextinstanceid=v5.contextinstanceid AND
v5.contextinstanceid=v6.contextinstanceid AND
v6.contextinstanceid=v7.contextinstanceid
AND v0.itemkind=1
) AS A1
ON
T1.EmpCNum=A1.EmpCNum
 AND T1.MgrCNum=A1.MgrCNum
 AND T1.MgrName=A1.MgrName
 AND T1.CountryCode=A1.CountryCode
 AND T1.StatusCode=A1.StatusCode When NOT MATCHED THEN
INSERT (EmailAddr, MgrCNum, MgrName, CountryCode,
        CNum, Name, StatusCode, SerialNum)

VALUES (A1, EmailAddr, A1.MgrCNum, A1.MgrName,
        A1.CountryCode, A1.CNum, A1.Name, A1.StatusCode, A1.SerialNum)
```

SYSTEM AND METHOD FOR MODELING SLOW CHANGING DIMENSION AND AUTO MANAGEMENT USING MODEL DRIVEN BUSINESS PERFORMANCE MANAGEMENT

BACKGROUND

1. Technical Field

The present disclosure relates to business performance management, and more specifically, to modeling a slow changing dimension or type2 dimension of its corresponding high level data warehouse model and its automatic management using model driven business performance management.

2. Description of Related Art

Model driven business performance management (BPM) is becoming an integral part of enterprise software portfolios in many large organizations. Models enable a flexible approach to define and manage business metrics, which monitor and issue alerts when encountering a situation, all abstracted at the business level.

BPM models may be categorized into three types, including observation, data warehouse and dashboard models. The observation model defines modeling elements that capture monitoring and alerting requirements. The data warehouse model captures historical data of the monitoring elements and the dashboard model captures reporting requirements.

These models are made up of well defined elements that are complete and unambiguous in nature. Common elements among the BPM models include metrics, maps and dimensions.

Turning now to an exemplary business problem: As a business grows and its usage of BPM ages, data that seemed static (organization, departments, etc) starts to change over time. The definition of relatively static data may also change to reflect the growth in a particular area of business.

From an analytical point of view one needs to keep track of the old definition and updated definition for this relatively static data. The business may need to look into a history of the current year and past years for the analysis, financial reporting, etc. Not being able to relate the data because of changes over time can make the analysis difficult. This problem could become more difficult if an underlying information technology (IT) system is not capable of handling change.

With respect to the data warehouse, the relatively static data is typically called dimensional data and such changes are termed as slow changing dimension. Typically data warehouse solutions are built manually and take into account changes by modifying the dimension definition to accommodate the changes. But such activity is manual in nature, requiring time and capital to manage the data.

Existing data warehouse models, e.g., a visibility model, in BPM do not provide any provision to reflect slow changing dimension requirements at a business solution modeling level.

If an attribute of a dimension changes, the existing solution in the runtime overrides the value. Thus, from the history point of view, the meaning of the data is lost.

For example consider a dimension called Division:

Original data (Date=1Q2006): DivID=24, DivName-Printers, DivHQ=New York (DivID is primary key)

Modified data (Date=3Q2006): DivID=24, DivName-Computer Peripherals, DivHQ=New York Modified data (Date=1Q2007): DivID=24, DivName-Computer Peripherals, DivHQ-Hartford In the above example, since both the DivName and DivHQ have been updated with time, any measurement associated with the DivID=24 in the past has lost the context. For example if one goes in the history of 1Q2006, the Div Name will read "computer peripherals" not "printers" as the data in dimension has no records for "printers," which was overridden.

Therefore, a need exists for extending a data warehouse model to capture slow changing dimension requirements that preserves the semantics of the dimension attribute definition as well as historical data. The auto code generation component also needs to be updated to reflect the appropriate data structure for slow changing dimension and corresponding ETL (extract, transform, load) scripts that populate the dimensional table during execution time.

SUMMARY

According to an embodiment of the present disclosure, a system for generating a model for tracking a changing dimension feature of data in a business model includes a memory for storing the business model and a computer readable code for modeling the changes in the changing dimension feature and a processor for executing the computer readable code to perform method steps including capturing the changing dimension feature of the business model, transforming the changing dimension feature into a data warehouse model corresponding the business model, identifying changing dimensions and attributes in the changing dimension feature according to the data warehouse model, and generating a run-time deployable component for tracking the changing dimension feature based on the identified changing dimensions and attributes.

According to an embodiment of the present disclosure, a computer readable medium is provided embodying instructions executable by a processor to perform a method for generating a model for tracking a changing dimension feature of data in a business model. The method steps includes providing a business model, capturing the changing dimension feature of the business model, transforming the changing dimension feature into a data warehouse model corresponding the business model, identifying changing dimensions and attributes in the changing dimension feature according to the data warehouse model, and generating a run-time deployable component for tracking the changing dimension feature based on the identified changing dimensions and attributes.

According to an embodiment of the present disclosure, a system for tracking a changing dimension feature of data in a data warehouse model includes a memory for storing the data warehouse model and a run-time deployable component for tracking the changing dimension feature, and a processor for executing run-time deployable component to track the changing dimension feature, the run-time deployable component including a dimension table extending the data warehouse model, the dimension table including, a surrogate key augmenting an existing key of the data warehouse model, an active flag indicating a current surrogate key, and a date indicating a for which data corresponding to the existing key was active.

BRIEF DESCRIPTION OF THE DRAWINGS

Preferred embodiments of the present disclosure will be described below in more detail, with reference to the accompanying drawings:

FIG. 7 is an illustration of sample IT meta model instance as result of transformation from business model showing slow changing dimension captured according to an embodiment of the present disclosure;

DETAILED DESCRIPTION OF EXEMPLARY EMBODIMENTS

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure are described in term of an extension of existing BPM models (see block 102, FIG. 1A) that are part of a Model Driven Business Transformation (MDBT) toolkit.

According to an embodiment of the present disclosure, a slow changing dimension at the model level is abstracted to hide complexity of implementing a solution. Business models including business performance and data warehouse models are provided 101. Stereotypes are newly defined or extended from existing stereotypes to capture the slow changing dimension requirements 102. The dimensional attribute value change is preserved in a physical database table by creating a new row in a dimension table 103. The dimensions and attributes that are slow changing are identified in a code generation process 104. A method according to an embodiment of the present disclosure uses a surrogate key both in a meta model and in the physical dimension tables. An auto software component generator is updated to create the dimension table definition, fact table definition and ETL scripts for automatic management of the slow changing dimensions during an execution phase 105.

According to an embodiment of the present disclosure, the BPM Models can be decomposed into smaller manageable components. These elements together with their operational semantics are self contained and define complete BPM solutions. These elements are defined using UML 2.0 (Unified Modeling Language) notations and use UML class diagrams to define the business solution model. Accordingly, new features can be added without disrupting the rest of the functionalities of the BPM system. The dimension element is one such element, which can be independently extended using stereotype notations to support slow changing dimension needs. The corresponding software generator can be independently updated to generate appropriate runtime components to support the requirement.

The changes made to the elements and the runtime components can be unit tested independently.

Figure 2:
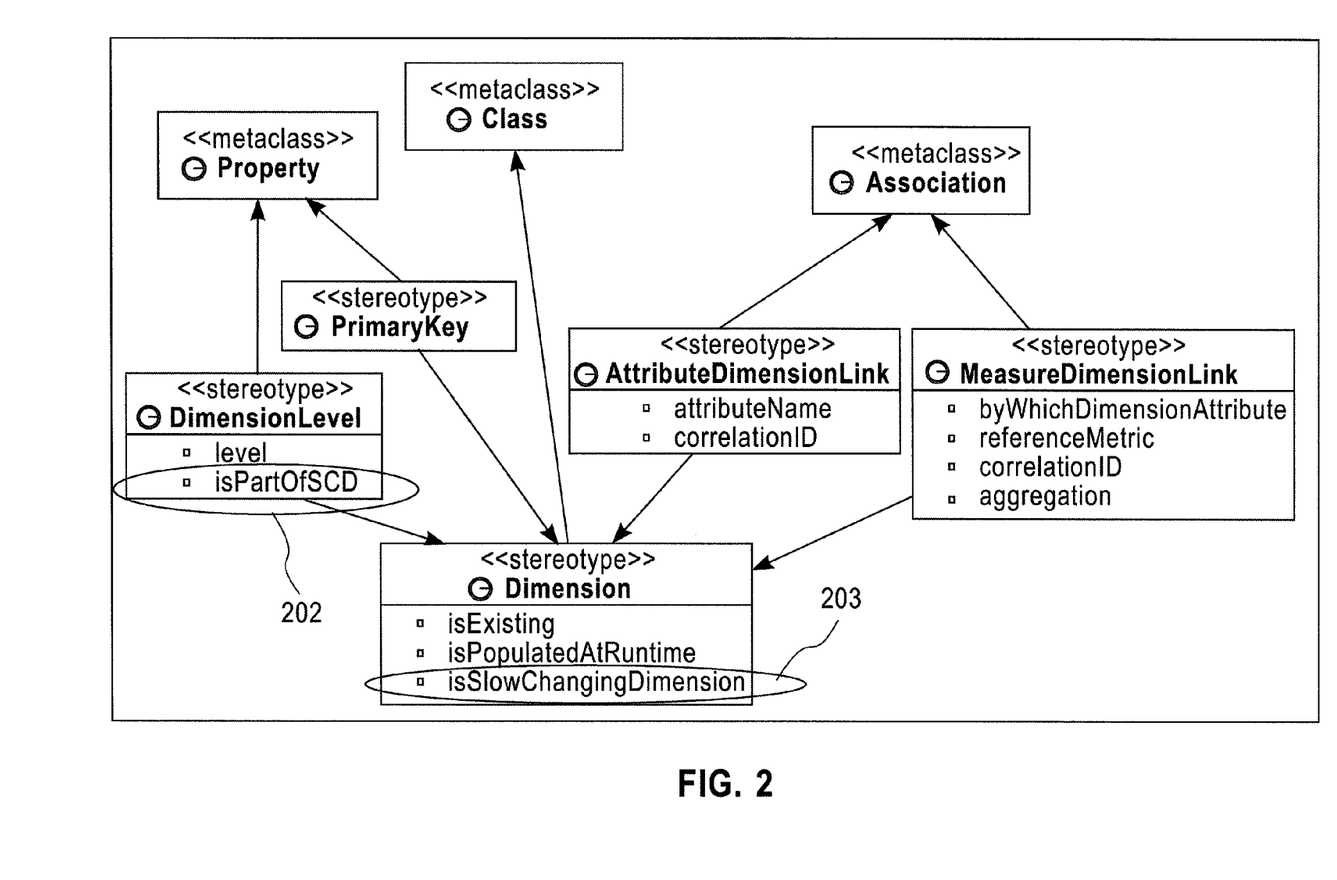
FIG. 2 is a diagram of an modeling artifacts that helps to capture data warehouse as well as slow changing dimension requirement at business level according to an embodiment of the present disclosure.

FIG. 2 illustrates the UML elements that comprises data warehouse model 201. These elements are extensions to basic UML elements and referred to as stereotypes. The most important stereotype is "Dimension." While designing a data warehouse model the classes that exhibits dimension behavior can be stereotyped with "Dimension" stereotype. This stereotype has properties to capture the characteristics of the dimension. The columns in a physical dimension are defined as attributes of the stereotyped class. Each column typically corresponds to a column in the report. Each attributed can further characterized by stereotypes such as "PrimaryKey" and "DimensionLevel." The "PrimaryKey" identifies the attribute with unique value and "DimensionLevel" allows a designer to define hierarchy for On-line analytical processing (OLAP) report.

The other stereotypes enable designer to link the dimensional attributes to the model metrics.

To support slow changing dimension, the following information needs to be captured:
  a. Whether a dimension is a slow changing dimension?
  b. Which attribute of the dimension should this characteristic applied?

By employing the model driven development techniques, the complexity of programming is hidden from developers through the use of a consistent and easy interface to develop solutions visually. To capture the above mentioned information in the model 201, extensions are provided to the data warehouse elements with additional properties for two stereotypes 202 and 203 as shown in FIG. 2. The "Dimension" stereotype receives a new property called "isSlowChangingDimension," which is a Boolean. When the value is true, it indicates that the respective dimension will be a slow changing dimension. The "DimensionLevel" stereotype receives a new property called "isPartOfSCD," which is also a Boolean. When the value is true, it indicates a particular dimension attribute (physical column) will be part of slow changing dimension. These properties allow a solution designer to specify the required information to indicate a slow changing dimension. The complexity of changes to dimension definition and corresponding ETL changes are hidden from the designer and managed by the automatic code generation component of the MDBT (Model Driven Business Transformation) toolkit. The changes manually performed could take significant time and cost by a trained data warehouse specialist for design, implementation, and testing. As illustrated above, the models simplify a process of enabling slow changing dimension capability by providing few information at the modeling level without any need for specialized skills in the area of data warehousing. Thus, it eliminates the time and cost required for implementation and significantly reduces the testing time.

Figure 1A:
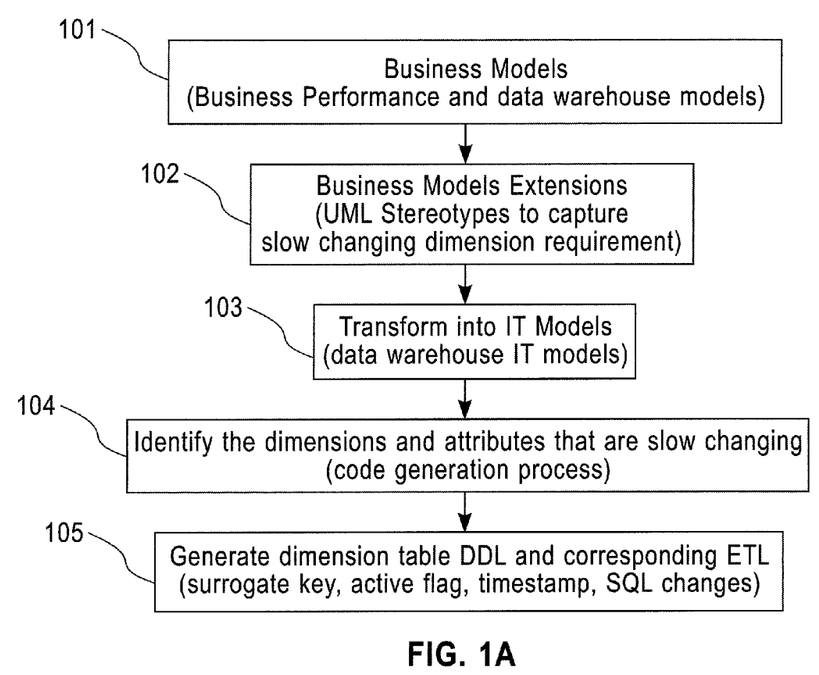
FIG. 1A is a flow chart of a method for capturing the slow changing dimension at business model level, transforming the business models into IT meta model and final generate the code to execute and manage according to an embodiment of the present disclosure.
Figure 3:
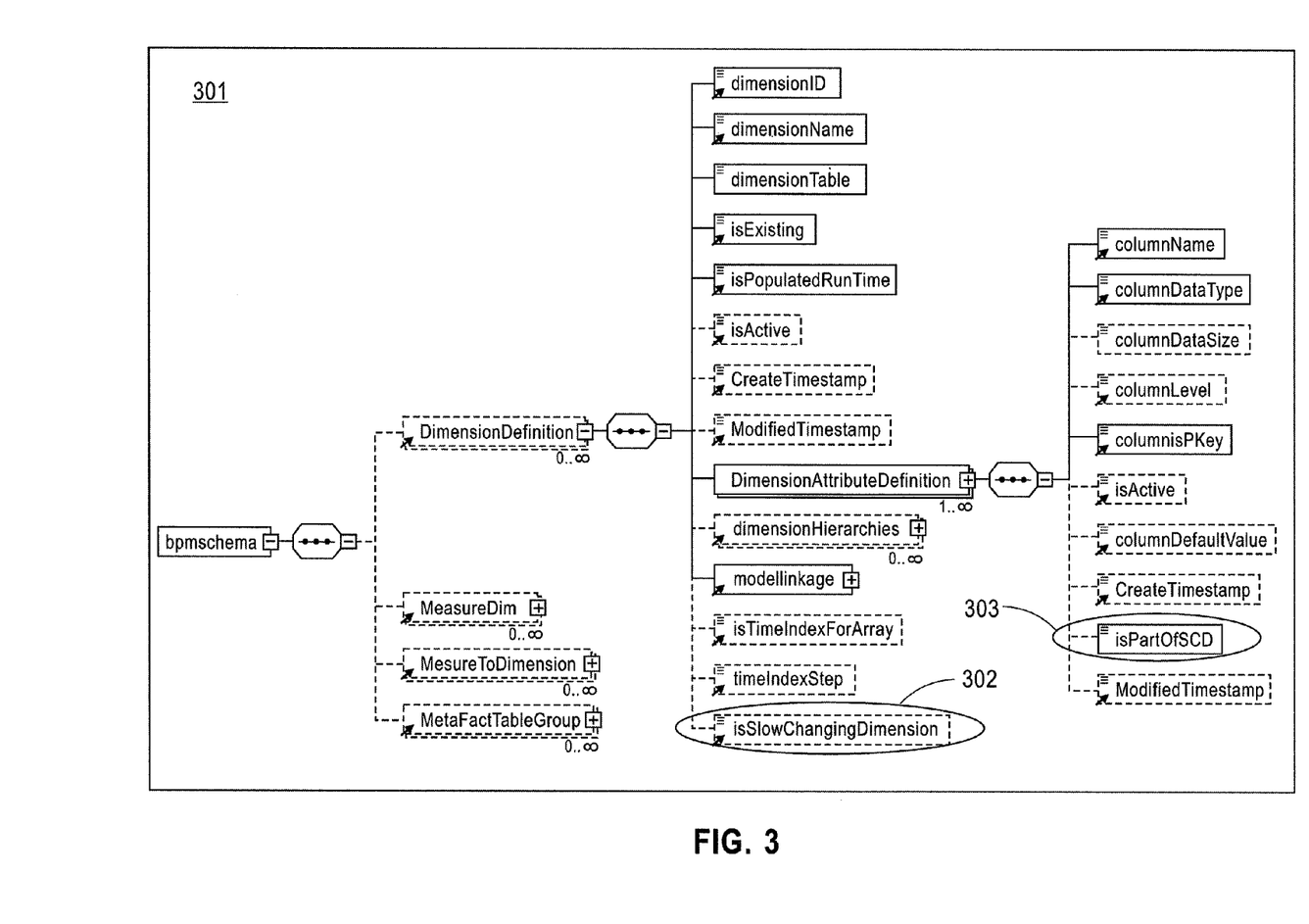
FIG. 3 is a diagram of a data warehouse XML meta-model including the slow changing dimension elements according to an embodiment of the present disclosure.

At block 103 in FIG. 1A, in the model driven activity is transformation of the UML models into intermediate models in XML or directly into runtime component. The data warehouse model first gets transformed into an XML instance, which is the input to the runtime code generation. The benefit of generating XML as the intermediate model is that the runtime code generation is not affected if an alternate modeling approach, which also generates the XML model, is used instead of UML. As long as the XML instance of data warehouse meta-model stays the same, the runtime component can be generated. FIG. 3 shows a partial data warehouse meta-model XML schema definition 301. The transformation component reads the UML model information and populates the XML instance using the definition illustrated in FIG. 2. For a slow changing dimension, the dimension property gets translated into the one of the DimensionDefinition element and DimensionAttributeDefinition in XML (see 302-303, FIG. 3).

Figure 1B:
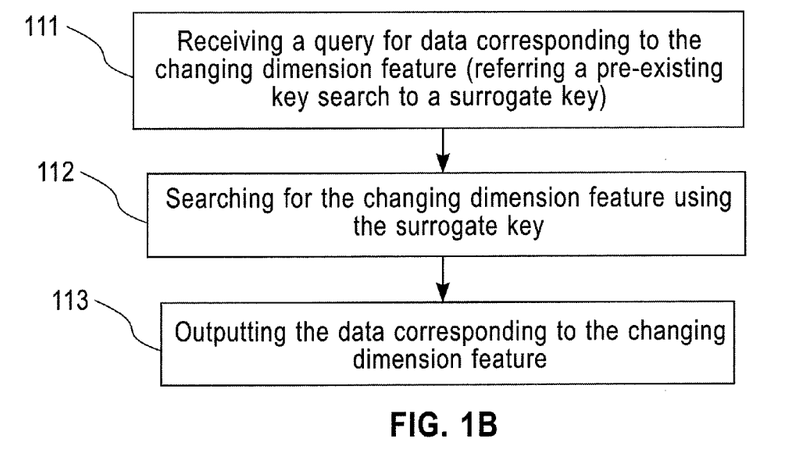
FIG. 1B is a flow chart of method for executing a search using a surrogate key according to an embodiment of the present disclosure.
Figure 4A:
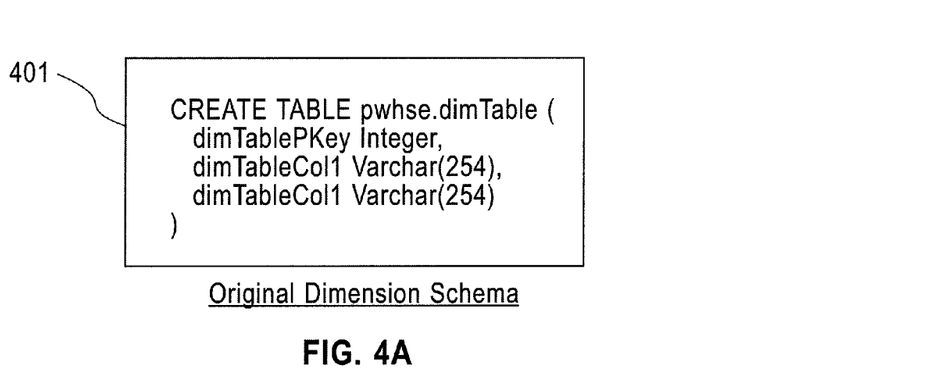
FIGS. 4A-B are illustrations of a auto generation of dimension schema and an updated dimension schema with a slow changing dimension from business models, respectively, according to an embodiment of the present disclosure.
Figure 4B:
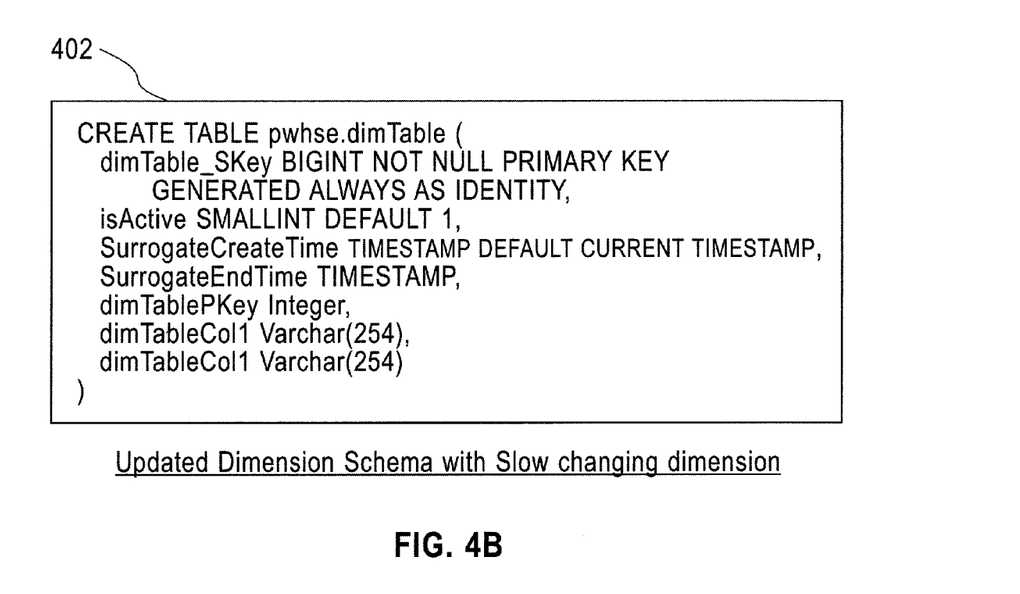

The transformation component (see also block 103, FIG. 1A) may be written in Java programming language as an eclipse plug-in, and the code generation component 104 generates following components:
 a. Data warehouse schema
 b. ETL scripts to load the data in the data warehouse (for both dimensions and fact tables)
 c. Alphablox-OLAP configuration and dashboard The slow changing dimension requirement also affects the data warehouse schema and ETL scripts code generation. The dimension table schema (401, FIG. 4A) needs to be changed to reflect the following four new columns to support the requirement (see for example, 402, FIG. 4B):
 Surrogate Key—acts as a new primary key for the respective dimension. The original primary key is preserved by the MDBT toolkit runtime for any future reference (see block 111, FIG. 1B). The surrogate key is now referred whenever there is an access of the slow changing dimension 112.
 Active flag—indicates which surrogate key value is current amongst multiple rows with the same original primary key.
 Start date, End date—indicate the duration for which a row with original primary key was active.

The additional columns created during runtime are now added back to the XML instance to preserve the integrity of the data definition between physical schema and meta model. The definition of the fact table is also updated to replace the original primary key with surrogate key as part of foreign key relationship constraint. The table gets a new row with new surrogate key value for the changes in values of columns of interest (that participate in slow changing dimension). The active flag is turned to true for the current entry and false for the previous entry of given original primary key. The end date is also populated for the previous row.

Figure 5A:
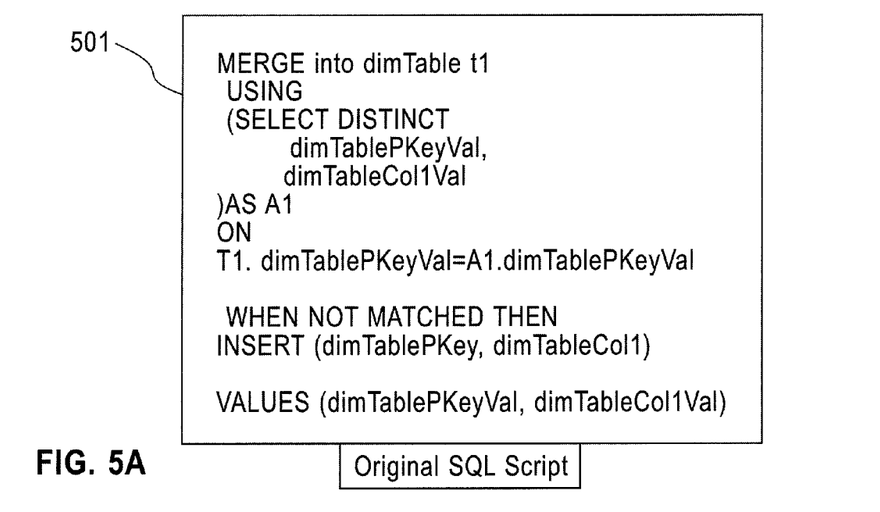
FIGS. 5A-B are illustrations of an auto generated SQL script and a modified SQL script to support a slow changing dimension from business models, respectively, according to an embodiment of the present disclosure.

The ETL script changes are reflected for dimension tables and fact tables (see also block 105, FIG. 1A). For the dimension table, the script uses merge SQL (Structured Query Language) query syntax. The SQL query determines whether there is an entry in the dimension table for a given original primary key. The FIG. 5A shows the original SQL query 501 without any slow changing dimension requirement.

Figure 5B:
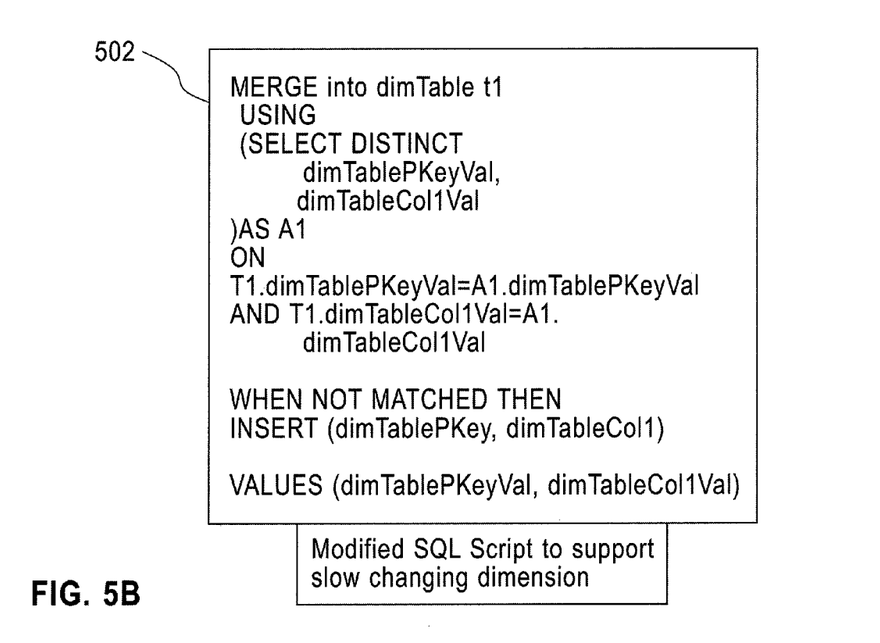

The FIG. 5B shows the updates being done to the SQL script 502 for slow changing dimension. The attributes of dimension that are flagged "isPartOfSCD" during modeling times now becomes part of the conditional clause as shown by the red ellipse. Hence if the value of the combination of the primary key and additional columns is not there in the dimension table a new row will be inserted. An update query is next executed to flag the previous row if any for a given primary key to inactive with timestamp marked. In the INSERT part of the query one can notice that the surrogate key and other additional columns are now shown as the values of these columns are set to default. This is because these columns have default values defined during their schema generation. For example the value of the surrogate key is set to default such a way that it gets the next number in sequence, the active flag is set to true, start date is set to current date and end date is left blank. The automatic script generation component also generates additional SQL script to update the active flag for one of the rows with the original primary key to false and also update the end date. The SQL script for the fact table now gets updated to read the surrogate key value from the dimension for the corresponding original primary key. Since the surrogate key value is internal to the system, the transaction source data reflects the original primary key value. Hence the automatic script generation takes into account to generate sub select query to read the surrogate key value which is active for given original primary key value.

Aside from SQL scripts, the MDBT toolkit also generates an OLAP (On-line Analytical Processing) style report for analysis purposes. Since the slow changing dimension requirement is at a data warehouse level and it is encapsulated by the data warehouse automated script generation, there was no impact to the automatic code generation of the OLAP cubes and Alphablox report component. By virtue of data on dashboard being read from data warehouse and shown by dimension, any slow changing dimension data gets shown automatically in a correct format on the dashboard.

Consider an example of a human resource department of a business needs to monitor the employee related metrics, such as the percentage of employees with valid resume, current resume, updated skills, etc. To analyze these metrics by context, dimensions, such as Employee, Organization, geography, Manager, Job type, etc., are defined. Now few of these contexts may undergo changes over time such as employee moves to a different job type or a division within an organization changes to a new name. Hence the report should be able to reflect the data by both old and new names by over time (see block 113, FIG. 1B). This uses the management of dimension data (to support slow changing dimension) as well as management of the data in the fact tables to be able to support such a report.

The MDBT toolkit has been extended to support this type of report. To engage the toolkit, one starts to build the observation model (OM).

Figure 6:
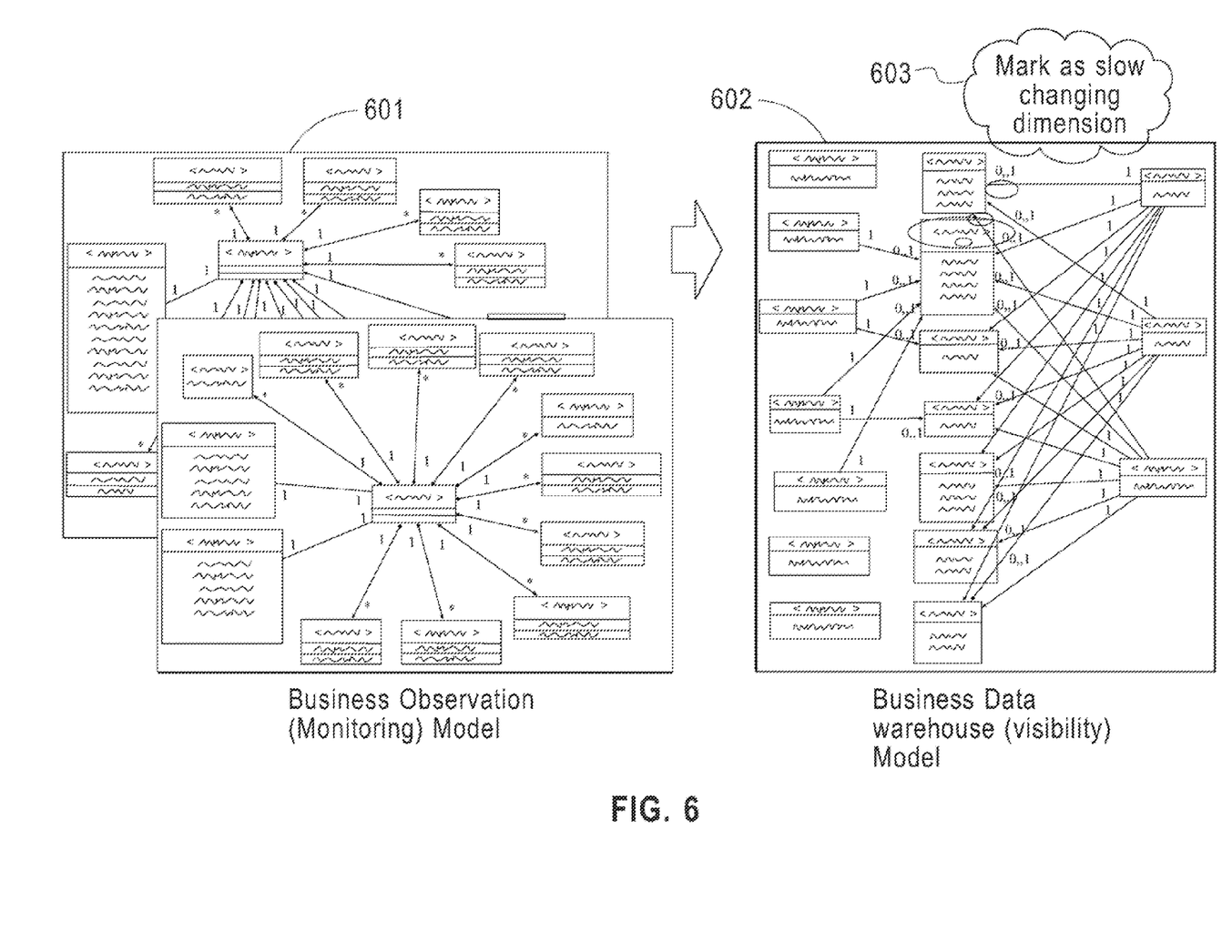
FIG. 6 is an illustration of a sample business model according to an embodiment of the present disclosure.

The model 601 in FIG. 6 shows observation models 602 comprising various BPM elements such as metrics, business events, and management context. The expression to calculate the metrics is defined in the operations part of the metric class. In this sample 5 monitoring contexts have been created that are part of this solution.

To create the data warehouse model 602, the dimensions that are needed for the solution, e.g., 603, are identified. A set of metrics are identified that are related to each other, which are grouped together under a class and stereotype them as "Dimension" and provide appropriate property values.

The business data warehouse model 602 from FIG. 6 shows one of the data warehouse model created for the slow changing requirement. Any dimension that will exhibit such nature needs to be identified at the modeling time. For this sample scenario in FIG. 6, the employee dimension that is circled is identified as a slow changing dimension by setting the value of "isSlowChangingDimension" property 603 to true. The attribute of this dimension that will be participate in change, the value of their ("isPartOfSCD") property also needs to be set to true; so are EmpManager, location, and status attributes of this dimension. These simple steps are all that is needed to change an ordinary dimension to a slow changing dimension. See also FIG. 7, wherein an exemplary IT meta model 701, including the "isSlowChangingDimension" property 702 and the "isPartOfSCD" property 703.

Figure 8:
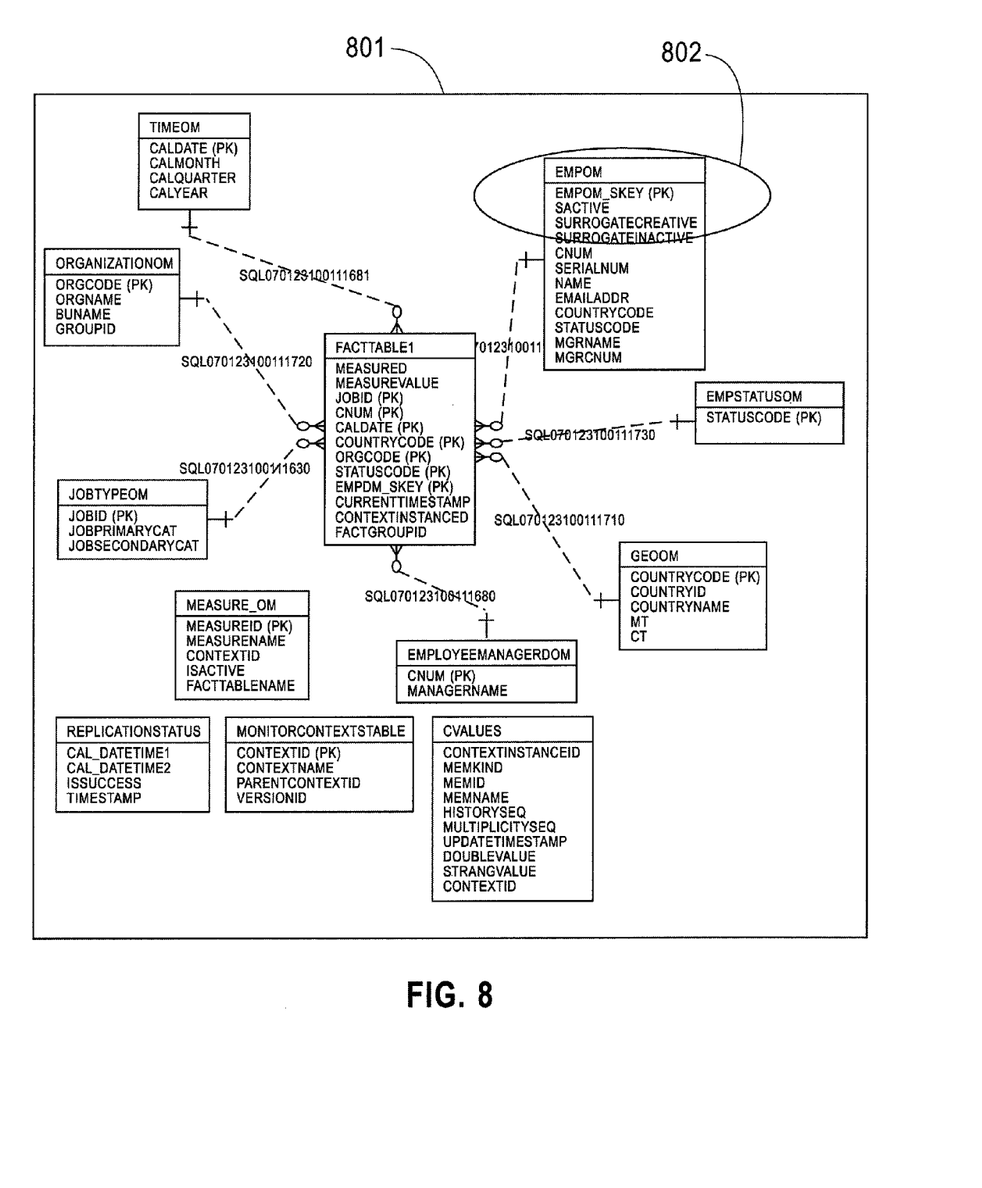
FIG. 8 is an exemplary auto generated data warehouse ER diagram from business models as part of transformation and code generation process, according to an embodiment of the present disclosure.

For code generation (see block 104, FIG. 1A), once the solution designer completes modeling activity, the run-time deployable component is generated by invoking the automatic code generation component. FIG. 8 shows the generated data warehouse entity relationship diagram 801 with the slow changing dimension EmpDim 802 (see also block 105, FIG. 1A). The additional four columns discussed earlier were automatically generated to support the employee dimension.

The fact table has an employee dimension surrogate key as entry instead of original primary key CNum, which is the employee serial number.

Figure 9:
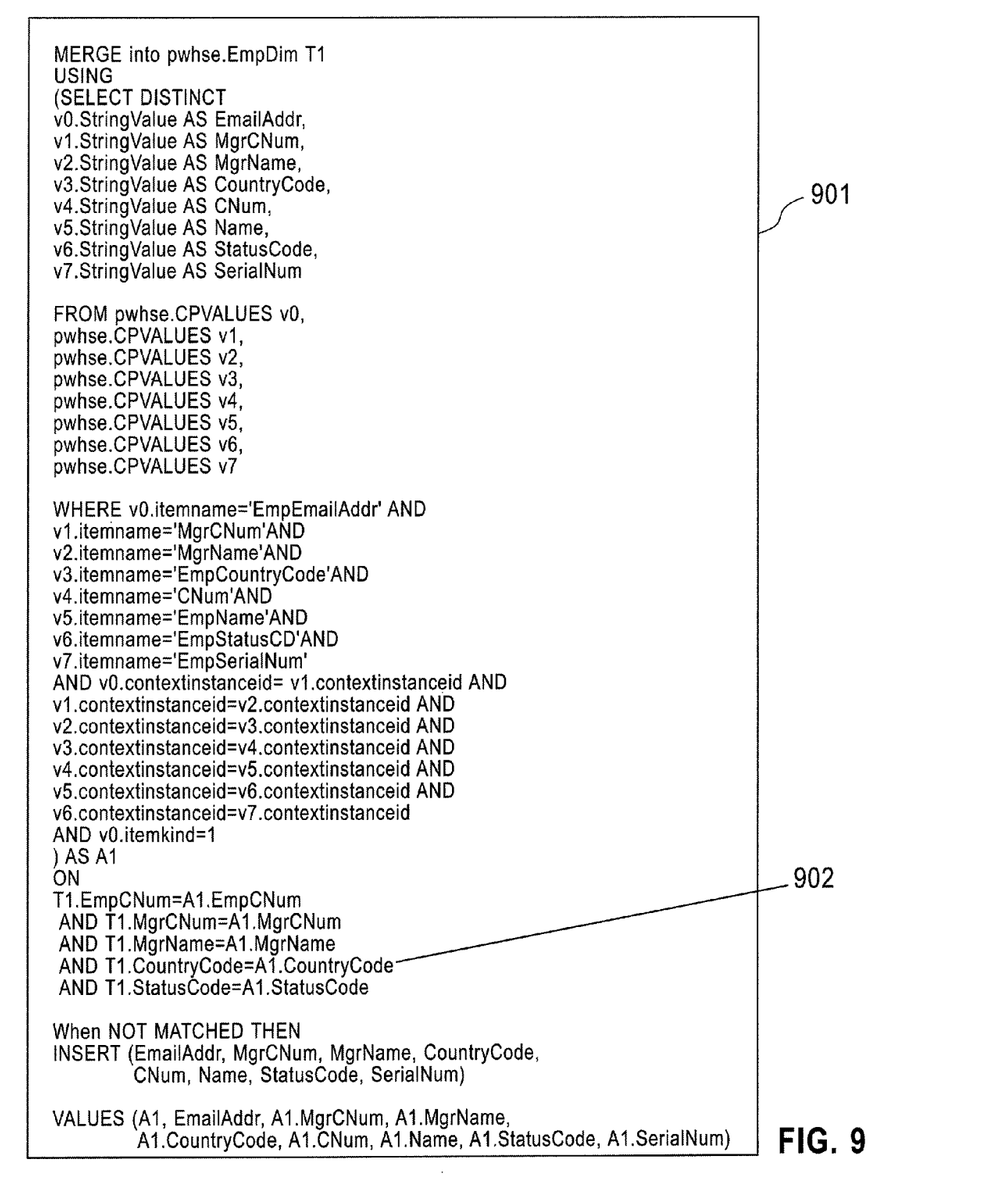
FIG. 9 is illustrates an auto generated SQL script that populates the dimension including slow changing according to an embodiment of the present disclosure.

The ETL component contains the updated SQL script for both dimension and fact table to support the slow changing employee dimension table. Since the dashboard component is not affected and thus can be deployed without change on Alphablox. See also FIG. 9, wherein an exemplary ETL SQL 901 includes an updated SQL script for both dimension and fact table to support the slow changing employee dimension table 902.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 10:
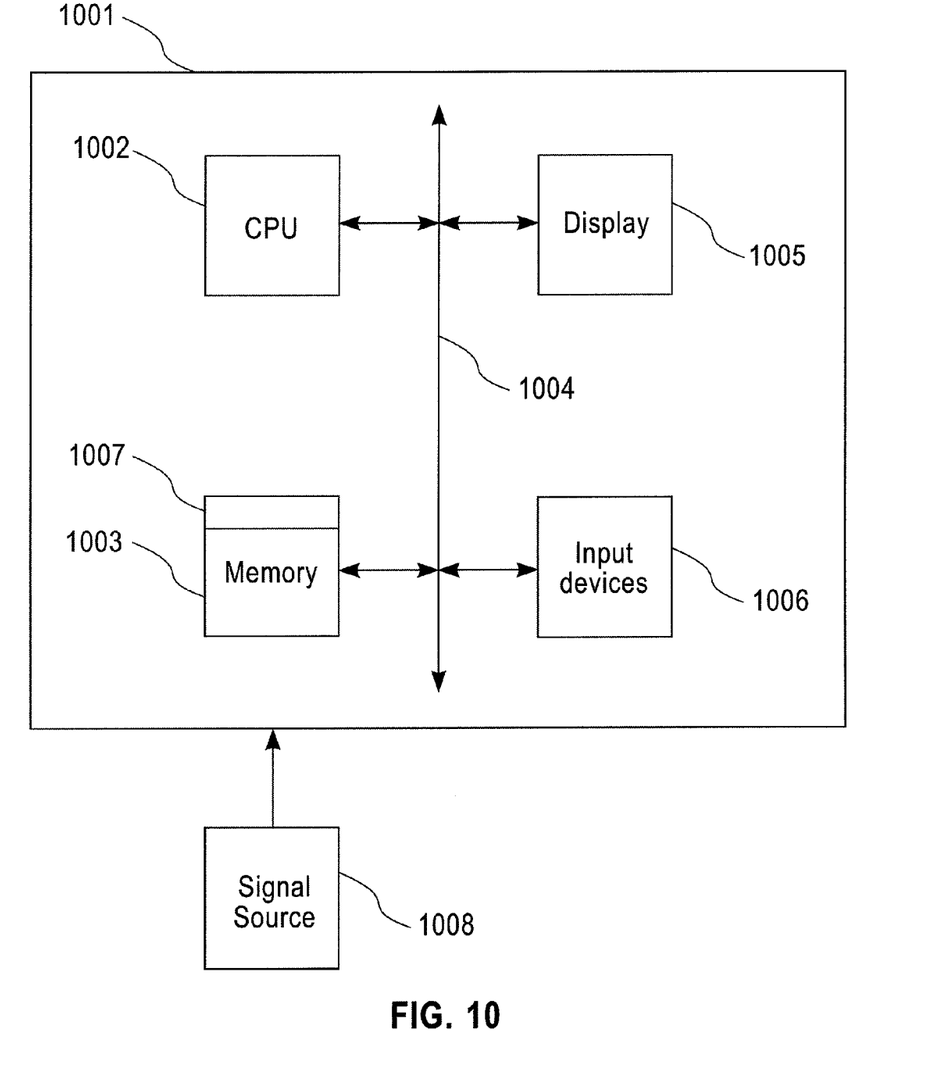
FIG. 10 is a diagram of a computer system for performing a method for creating an automatic manager of changing dimensions in a business process model according to an embodiment of the present disclosure.

Referring to FIG. 10, according to an embodiment of the present invention, a computer system 1001 for automatic management of changing dimensions of a BPM can comprise, inter alia, a central processing unit (CPU) 1002, a memory 1003 and an input/output (I/O) interface 1004. The computer system 1001 is generally coupled through the I/O interface 1004 to a display 1005, e.g., for display of the video data, and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, or a combination thereof. The present invention can be implemented as a routine 1007 that is stored in memory 1003 and executed by the CPU 1002 to process the signal from the signal source 1008. As such, the computer system 1001 is a general-purpose computer system that becomes a specific-purpose computer system when executing the routine 1007 of the present invention.

The computer platform 1001 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for automatic management of changing dimensions in a BPM, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A system for generating a model for tracking a changing dimension feature of data in a business model comprising:
    a memory for storing the business model and a computer readable code for modeling changes in the changing dimension feature; and
    a processor for executing the computer readable code to perform method steps for supporting a model of the changing dimension feature of the business model by at least two properties of the business model, that when executed by the processor perform the method steps comprising,
    transforming the business model supporting the model of the changing dimension feature into a data warehouse model,
    identifying changing dimensions and attributes in the changing dimension feature according to the business model, and
    generating a run-time deployable component for updating the changing dimension feature upon identifying the changing dimensions and attributes, wherein generating the run-time deployable component generates comprises updating a merge query configured for determining wherein there exists an entry in a dimension table for a primary key, the updating creating a modified query for determining that the changing dimension feature is to be updated upon reading the changing dimension attribute during the run-time, wherein the modified query is configured to flag a previous row for the primary key to inactive with a timestamp, and wherein the run-time deployable component is an extension to the data warehouse model.

2. The system of claim 1, where the computer readable code captures the changing dimension feature at a business solution level.

3. The system of claim 1, where the computer readable code is an extension to the business model.

4. The system of claim 1, wherein the run-time deployable component includes computer readable code for tracking a name change and adds code to the dimension feature for time stamping changes.

5. A computer readable storage medium embodying instructions executable by a processor to perform a method for generating a model for tracking a changing dimension feature of data in a business model, that when executed by the processor perform the method steps comprising:
    providing a business model supporting a model of the changing dimension feature of the business model by at least two properties of the business model;
    transforming the business model supporting the model of the changing dimension feature into a data warehouse model;
    identifying changing dimensions and attributes in the changing dimension feature according to the business model, and
    generating a run-time deployable component for updating the changing dimension feature upon identifying the changing dimensions and attributes, wherein generating the run-time deployable component generates comprises updating a merge query configured for determining wherein there exists an entry in a dimension table for a primary key, the updating creating a modified query for determining that the changing dimension feature is to be updated upon reading the changing dimension attribute during the run-time, wherein the modified query is configured to flag a previous row for the primary key to inactive with a timestamp, and wherein the run-time deployable component is an extension to the data warehouse model.

6. The computer readable storage medium claim 5, wherein generating the run-time deployable component comprises generating a script for loading data in the data warehouse model.

7. The computer readable storage medium of claim 5, wherein the method further comprises modifying the data warehouse model to comprise the dimension table corresponding to the changing dimension feature, wherein the dimension table comprises a surrogate key augmenting the primary key of the data warehouse model, an active flag indicating a current surrogate key, and an end-date indicating a duration for which data corresponding to the primary key was active.

8. The computer readable storage medium of claim 7, wherein generating the query further comprises:
   searching for the data corresponding to the changing dimension feature in the data warehouse model using the current surrogate key; and
   outputting the data corresponding to the changing dimension feature.

9. A system for tracking a changing dimension element in a data warehouse model comprising:
   a memory for storing the data warehouse model and a run-time deployable component for tracking the changing dimension element; and
   a processor for executing the run-time deployable component to track the changing dimension element over time, the run-time deployable component comprising:
      a dimension table supporting the changing dimension element, the dimension table extending the data warehouse model and preserving an existing attribute key value, the dimension table comprising,
      a surrogate key value augmenting the existing attribute key value of the dimension element,
      an active flag indicating a current entry of the surrogate key among a plurality of data entries in the dimension element sharing the existing attribute key value, and
      an indication of a duration for which a data entry of the dimension element storing the existing attribute key value was active,
      wherein the run-time deployable component comprises an updated merge query for determining that the changing dimension element is to be updated and reporting data of the changing dimension element for both the existing attribute key value and the surrogate key value upon reading the changing dimension element during the run-time, wherein the updated modified query is configured to flag a previous row for the existing attribute key value to inactive with a timestamp, and wherein the run-time deployable component is an extension to the data warehouse model,
      the run-time deployable component modifying the data warehouse model to comprise the dimension table.

10. The system of claim 1, wherein at least one change in the attributes is a change in an attribute key value.

11. The computer readable storage medium of claim 5, wherein at least one change in the attributes is a change in an attribute key value.

* * * * *